United States Patent
Fan (10) Patent No.: US 9,319,611 B2
(45) Date of Patent: Apr. 19, 2016

(54) IMAGE SENSOR WITH FLEXIBLE PIXEL SUMMING

(71) Applicant: Apple Inc., Cupertino, CA (US)

(72) Inventor: Xiaofeng Fan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 13/830,748

(22) Filed: Mar. 14, 2013

(65) Prior Publication Data

US 2014/0263951 A1 Sep. 18, 2014

(51) Int. Cl.
*H04N 5/378* (2011.01)
*H04N 5/347* (2011.01)
*H04N 5/355* (2011.01)

(52) U.S. Cl.
CPC .............. *H04N 5/378* (2013.01); *H04N 5/347* (2013.01); *H04N 5/355* (2013.01)

(58) Field of Classification Search
CPC ................... H01L 27/14643; H01L 27/14609; H01L 27/14603; H04N 3/155; H04N 5/335
USPC ....................................... 250/208.1; 348/308
See application file for complete search history.

(56) References Cited

U.S. PATENT DOCUMENTS

| | | | |
|---|---|---|---|
| 4,686,648 A | 8/1987 | Fossum | |
| 5,105,264 A | 4/1992 | Erhardt et al. | |
| 5,329,313 A * | 7/1994 | Keith | H04N 19/503 375/240.22 |
| 5,396,893 A | 3/1995 | Oberg et al. | |
| 5,880,459 A | 3/1999 | Pryor et al. | |
| 6,040,568 A | 3/2000 | Caulfield et al. | |
| 6,233,013 B1 | 5/2001 | Hosier et al. | |
| 6,348,929 B1 | 2/2002 | Acharya et al. | |
| 6,713,796 B1 | 3/2004 | Fox | |
| 6,714,239 B2 | 3/2004 | Guidash | |
| 6,798,453 B1 | 9/2004 | Kaifu | |
| 6,816,676 B2 | 11/2004 | Bianchi et al. | |
| 6,905,470 B2 | 6/2005 | Lee et al. | |
| 6,982,759 B2 | 1/2006 | Goto | |

(Continued)

FOREIGN PATENT DOCUMENTS

| | | |
|---|---|---|
| CN | 1842138 | 10/2006 |
| CN | 101189885 | 5/2008 |

(Continued)

OTHER PUBLICATIONS

Feng, et al., "On the Stoney Formula for a Thin Film/Substrate System with Nonuniform Substrate Thickness," Journal of Applied Mechanics, Transactions of the ASME, vol. 74, Nov. 2007, pp. 1276-1281.

(Continued)

*Primary Examiner* — Seung C Sohn
(74) *Attorney, Agent, or Firm* — Brownstein Hyatt Farber Schreck, LLP (57) ABSTRACT

An image sensor can include pixels that are grouped into subsets of pixels, with each subset including three or more pixels. A method for asymmetrical high dynamic range imaging can include capturing an image of a subject scene using a single integration time for all of the pixels. In a subset of pixels, charge in N pixels is read out and summed together. N represents a number that is between two and one less than a total number of pixels in the subset. Un-summed charge is read out from one pixel in the subset. The un-summed charge and the summed charge are combined when producing a high dynamic range image.

20 Claims, 7 Drawing Sheets

(56) References Cited

U.S. PATENT DOCUMENTS

| | | |
|---|---|---|
| 7,091,466 B2 | 8/2006 | Bock |
| 7,259,413 B2 | 8/2007 | Rhodes |
| 7,262,401 B2 | 8/2007 | Hopper et al. |
| 7,271,835 B2 | 9/2007 | Iizuka et al. |
| 7,282,028 B2 | 10/2007 | Kim et al. |
| 7,332,786 B2 | 2/2008 | Altice, Jr. et al. |
| 7,390,687 B2 | 6/2008 | Boettiger |
| 7,437,013 B2 | 10/2008 | Anderson |
| 7,443,421 B2 | 10/2008 | Stavely et al. |
| 7,502,054 B2 | 3/2009 | Kalapathy |
| 7,525,168 B2 | 4/2009 | Hsieh |
| 7,554,067 B2 | 6/2009 | Zarnoski et al. |
| 7,555,158 B2 | 6/2009 | Lee |
| 7,626,626 B2 | 12/2009 | Panicacci |
| 7,671,435 B2 | 3/2010 | Ahn |
| 7,728,351 B2 | 6/2010 | Shim |
| 7,733,402 B2 | 6/2010 | Egawa et al. |
| 7,742,090 B2 | 6/2010 | Street |
| 7,773,138 B2 | 8/2010 | Lahav et al. |
| 7,796,171 B2 | 9/2010 | Gardner |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 8,026,966 B2 | 9/2011 | Altice |
| 8,032,206 B1 | 10/2011 | Farazi et al. |
| 8,089,524 B2 | 1/2012 | Urisaka |
| 8,094,232 B2 | 1/2012 | Kusaka |
| 8,140,143 B2 | 3/2012 | Picard et al. |
| 8,153,947 B2 | 4/2012 | Barbier et al. |
| 8,159,588 B2 | 4/2012 | Boemler |
| 8,184,188 B2 | 5/2012 | Yaghmai |
| 8,194,148 B2 | 6/2012 | Doida |
| 8,194,165 B2 | 6/2012 | Border et al. |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,340,407 B2 | 12/2012 | Kalman |
| 8,350,940 B2 | 1/2013 | Smith et al. |
| 8,400,546 B2 | 3/2013 | Itano et al. |
| 8,456,559 B2 | 6/2013 | Yamashita |
| 8,508,637 B2 | 8/2013 | Han et al. |
| 8,514,308 B2 | 8/2013 | Itonaga et al. |
| 8,547,388 B2 | 10/2013 | Cheng |
| 8,581,992 B2 | 11/2013 | Hamada |
| 8,619,163 B2 | 12/2013 | Ogua |
| 8,629,484 B2 | 1/2014 | Ohri et al. |
| 8,634,002 B2 | 1/2014 | Kita |
| 8,648,947 B2 | 2/2014 | Sato et al. |
| 8,723,975 B2 | 5/2014 | Solhusvik |
| 8,754,983 B2 | 6/2014 | Sutton |
| 8,755,854 B2 | 6/2014 | Addison et al. |
| 8,803,990 B2 | 8/2014 | Smith |
| 8,817,154 B2 | 8/2014 | Manabe et al. |
| 8,902,330 B2 | 12/2014 | Theuwissen |
| 8,908,073 B2 | 12/2014 | Minagawa |
| 8,934,030 B2 | 1/2015 | Kim et al. |
| 8,946,610 B2 | 2/2015 | Iwabuchi et al. |
| 8,982,237 B2 | 3/2015 | Chen |
| 9,054,009 B2 | 6/2015 | Oike et al. |
| 9,066,017 B2 | 6/2015 | Geiss |
| 9,066,660 B2 | 6/2015 | Watson et al. |
| 9,088,727 B2 | 7/2015 | Trumbo |
| 9,099,604 B2 | 8/2015 | Roy |
| 9,100,597 B2 | 8/2015 | Hu |
| 9,131,171 B2 | 9/2015 | Aoki et al. |
| 2003/0036685 A1 | 2/2003 | Goodman et al. |
| 2004/0207836 A1 | 10/2004 | Chhibber et al. |
| 2006/0274161 A1 | 12/2006 | Ing et al. |
| 2007/0263099 A1 | 11/2007 | Motta et al. |
| 2008/0177162 A1 | 7/2008 | Bae et al. |
| 2008/0315198 A1 | 12/2008 | Jung |
| 2008/0316346 A1* | 12/2008 | Watanabe ............... 348/294 |
| 2009/0030630 A1* | 1/2009 | Eitan et al. ............... 702/81 |
| 2009/0033792 A1* | 2/2009 | Kano et al. ............... 348/441 |
| 2009/0096901 A1 | 4/2009 | Bae et al. |
| 2009/0101914 A1 | 4/2009 | Hirotsu et al. |
| 2009/0201400 A1 | 8/2009 | Zhang et al. |
| 2010/0066849 A1* | 3/2010 | Lim et al. ............... 348/222.1 |
| 2010/0134631 A1* | 6/2010 | Voth ............... G01N 15/1459 348/169 |
| 2011/0028802 A1 | 2/2011 | Addison et al. |
| 2011/0080500 A1 | 4/2011 | Wang et al. |
| 2011/0156197 A1 | 6/2011 | Tivarus et al. |
| 2011/0205415 A1 | 8/2011 | Makino et al. |
| 2011/0245690 A1 | 10/2011 | Watson et al. |
| 2012/0092541 A1 | 4/2012 | Tuulos et al. |
| 2012/0098964 A1 | 4/2012 | Oggier et al. |
| 2012/0153125 A1 | 6/2012 | Oike et al. |
| 2013/0147981 A1 | 6/2013 | Wu |
| 2013/0155271 A1 | 6/2013 | Ishii |
| 2014/0004644 A1 | 1/2014 | Roy |
| 2014/0049683 A1 | 2/2014 | Guenter |
| 2014/0071321 A1 | 3/2014 | Seyama |
| 2014/0240550 A1 | 8/2014 | Taniguchi |
| 2014/0246568 A1 | 9/2014 | Wan |
| 2014/0247378 A1 | 9/2014 | Sharma et al. |
| 2014/0252201 A1 | 9/2014 | Li et al. |
| 2014/0253754 A1 | 9/2014 | Papiashvili |
| 2014/0253768 A1 | 9/2014 | Li |
| 2014/0267855 A1 | 9/2014 | Fan |
| 2014/0347533 A1 | 11/2014 | Toyoda |
| 2014/0354861 A1 | 12/2014 | Pang |
| 2015/0163392 A1 | 6/2015 | Malone et al. |
| 2015/0163422 A1 | 6/2015 | Fan et al. |
| 2015/0237314 A1 | 8/2015 | Hasegawa |
| 2015/0264241 A1 | 9/2015 | Kleekajai et al. |
| 2015/0264278 A1 | 9/2015 | Kleekajai et al. |
| 2015/0312479 A1 | 10/2015 | McMahon et al. |
| 2015/0350575 A1 | 12/2015 | Agranov et al. |

FOREIGN PATENT DOCUMENTS

| | | |
|---|---|---|
| CN | 101233763 | 7/2008 |
| CN | 101472059 | 7/2009 |
| CN | 101567977 | 10/2009 |
| CN | 101622859 | 1/2010 |
| CN | 101803925 | 8/2010 |
| CN | 102036020 | 4/2011 |
| CN | 102821255 | 12/2012 |
| CN | 103329513 | 9/2013 |
| CN | 103546702 | 1/2014 |
| EP | 2023611 | 2/2009 |
| EP | 2107610 | 10/2009 |
| EP | 2230690 | 9/2010 |
| JP | 201149697 | 3/2011 |
| KR | 20030034424 | 5/2003 |
| KR | 20030061157 | 7/2003 |
| KR | 2008/0069851 | 7/2008 |
| KR | 20100008239 | 1/2010 |
| KR | 20100065084 | 6/2010 |
| KR | 20130074459 | 7/2013 |
| TW | 201301881 | 1/2013 |
| WO | WO 2010/120945 | 10/2010 |
| WO | WO 2012/053363 | 4/2012 |
| WO | WO 2012/088338 | 6/2012 |
| WO | WO 2012/122572 | 9/2012 |
| WO | WO 2013/008425 | 1/2013 |
| WO | WO 2013/179018 | 12/2013 |
| WO | WO 2013/179020 | 12/2013 |

OTHER PUBLICATIONS

International Search Report and Written Opinion dated May 23, 2014, PCT/US2014/016788, 11 pages.

Aoki et al., "Rolling-Shutter Distortion-Free 3D Stacked Image Sensor with—160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.

(56) References Cited

OTHER PUBLICATIONS

Elgendi, "On the Analysis of Fingertip Photoplethysmogram Signals," *Current Cardiology Reviews*, 2012, vol. 8, pp. 14-25.

Fu, et al., "Heart Rate Extraction from Photoplethysmogram Waveform Using Wavelet Multui-resolution Analysis," *Journal of Medical and Biological Engineering*, 2008, vol. 28, No. 4, pp. 229-232.

Han, et al., "Artifacts in wearable photoplethysmographs during daily life motions and their reduction with least mean square based active noise cancellation method," *Computers in Biology and Medicine*, 2012, vol. 42, pp. 387-393.

Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.

Santos, et al., "Accelerometer-assisted PPG Measurement During Physical Exercise Using the LAVIMO Sensor System," *Acta Polytechnica*, 2012, vol. 52, No. 5, pp. 80-85.

Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.

Schwarzer, et al., On the determination of film stress from substrate bending: STONEY'S formula and its limits, Jan. 2006, 19 pages.

Yan, et al., "Reduction of motion artifact in pulse oximetry by smoothed pseudo Wigner-Ville distribution," *Journal of NeuroEngineering and Rehabilitation*, 2005, vol. 2, No. 3, pp. 1-9.

Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

\* cited by examiner

IMAGE SENSOR WITH FLEXIBLE PIXEL SUMMING

TECHNICAL FIELD

The present invention relates generally to electronic devices, and more specifically, to image sensors for electronic devices.

BACKGROUND

Cameras and other image recording devices often use one or more image sensors, such as a charge-coupled device (CCD) image sensor or a complementary metal-oxide-semiconductor (CMOS) image sensor. When an image of a scene is captured, the scene can include objects that can be positioned or illuminated in a way that can make it difficult to represent the objects with acceptable detail. For example, an object in the scene can be positioned in a shadow, or the object can be illuminated by a bright light source, such as the sun.

The dynamic range of an image sensor quantifies the ability of the image sensor to adequately image both high light areas in a scene and low dark areas or shadows in the scene. In general, the dynamic range of an image sensor is less than that of the human eye. The limited dynamic range of an image sensor can result in an image losing details in the brighter areas or in the darker areas of the scene.

A variety of algorithms have been produced to improve the dynamic range of image sensors. One such algorithm varies the integration times (the time light is collected) of the pixels in the image sensor, which produces multiple images of a scene. For example, some pixels can have a shorter integration time while other pixels can have a longer integration time. The pixels with the shorter integration time can better capture the brighter areas in a scene and the pixels with the longer integration time can better capture darker areas in the scene. The charge or signals output from the pixels having the shorter and longer integration times can be combined to produce a final high dynamic range image that has more detail in the lighter and darker areas of the image.

However, when integration times of the pixels are varied, the final high dynamic range image can include undesirable motion artifacts. Since the final high dynamic range image is essentially a combination of two images, one image captured with the shorter integration time and another image captured with the longer integration time, objects in the scene can move in between the times the two images are captured. Thus, the scene represented in the image captured with the shorter integration time can differ from the scene represented in the image captured with the longer integration time. This difference can produce motion artifacts, such as blurring, in the combined final high dynamic range image.

SUMMARY

In one aspect, an image sensor can include pixels that are grouped into subsets of three or more pixels. Each pixel can include a photodetector and a transfer transistor. The transfer transistors in a subset are connected between the photodetectors in the subset and a common node. Thus, the photodetectors in each subset are operably connected to a respective common node. A method for flexible pixel summing includes for a subset of three or more pixels, selecting N pixels to include in a summing operation, where N represents a number that is between two and a total number of pixels in the subset of pixels. The charge in the N pixels is summed together by transferring the charge from the photodetectors in the N pixels to the common node. The charge can be transferred sequentially, simultaneously, or in various combinations. The summed charge is then read out from the common node.

In another aspect, a color filter array can be disposed over the plurality of pixels in an image sensor. The color filter array includes filter elements and a filter element can be disposed over each pixel. A filter element can restrict the wavelengths of light that are incident upon the pixel underlying the filter element. A color filter array can be used to filter light representing one or more colors.

In another aspect, an image sensor includes pixels that are grouped into subsets of three or more pixels. A method for asymmetrical high dynamic range imaging can include capturing an image of a subject scene using a single integration time for all of the pixels and in a subset of pixels, reading out charge in N pixels and summing the charge together. N represents a number that is between two and one less than the total number of pixels in the subset of pixels. Un-summed charge is read out from one pixel in the subset. The un-summed charge and the summed charge can be combined to produce a high dynamic range image. The method can be performed for each color plane in a color filter array. Alternatively, charge from two or more color planes can be summed and/or combined. By way of example only, for monochrome high dynamic range imaging, two or more color planes can be summed.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide an image sensor or image capture device that is capable of performing flexible pixel summing and/or asymmetrical HDR imaging. Pixels in the image sensor can be grouped into subsets of three or more pixels. Each pixel can include a photodetector and a transfer transistor. The transfer transistors in a subset are connected between the photodetectors in the subset and a separate common node. Thus, the photodetectors in each subset are operably connected to a respective common node. Flexible pixel summing can include, for a subset of three or more pixels, selecting N pixels to include in a summing operation, where N represents a number that is between two and a total number of pixels in the subset of pixels. The charge in the N pixels is summed together by transferring the charge from the photodetectors in the N pixels to the common node. The charge can be transferred sequentially, simultaneously, or in various combinations. The summed charge is then read out from the common node.

With flexible pixel summing, charge in any number of pixels within a subset of pixels can be summed together. In some embodiments, charge summing with two pixels can be performed as vertical two pixel summing, horizontal two pixel summing, diagonal two pixel summing, and four pixel summing. Alternatively, three or more pixels can be summed together. Charge representing the same color or different colors can be summed together.

With asymmetrical high dynamic range imaging, the pixels in an image sensor can be grouped into subsets of pixels and each subset can include three or more pixels. An image of a subject scene is captured using a single integration time for all of the pixels in the image sensor. In a subset of pixels, charge from N pixels can be read out and summed together. N represents a number that is between two and one less than a total number of pixels in the subset of pixels. Un-summed charge can be read out of one pixel in the subset of pixels. The un-summed charge can be combined with the summed charge when a high dynamic range image is produced.

Directional terminology, such as "top", "bottom", "front", "back", "leading", "trailing", etc., is used with reference to the orientation of the Figure(s) being described. Because components in various embodiments can be positioned in a number of different orientations, the directional terminology is used for purposes of illustration only and is in no way limiting. When used in conjunction with layers of an image sensor wafer, image sensor die, or corresponding image sensor, the directional terminology is intended to be construed broadly, and therefore should not be interpreted to preclude the presence of one or more intervening layers or other intervening image sensor features or elements. Thus, a given layer that is described herein as being formed on, formed over, disposed on, or disposed over another layer may be separated from the latter layer by one or more additional layers.

Figure 1A:
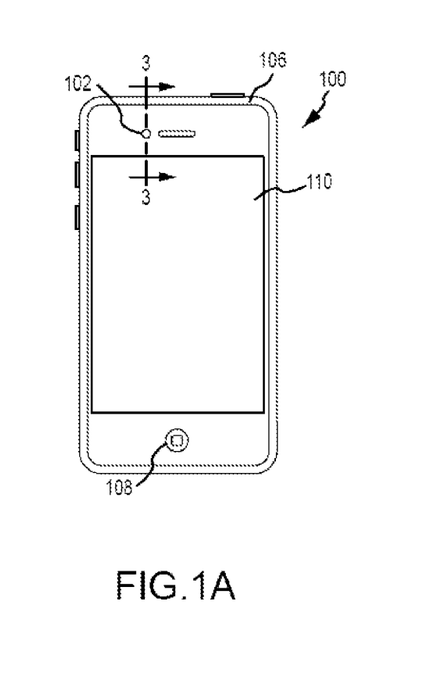
FIG. 1A illustrates a front perspective view of an electronic device including one or more cameras in an embodiment.
Figure 1B:
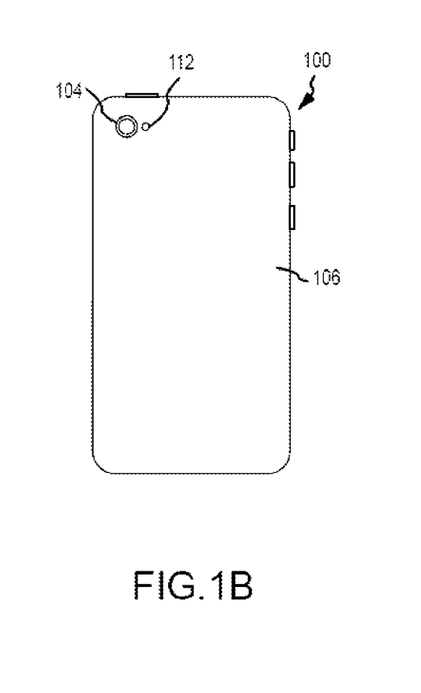
FIG. 1B depicts a rear perspective view of the electronic device of FIG. 1A.

Referring now to FIGS. 1A-1B, there are shown front and rear perspective views of an electronic device that includes one or more cameras in an embodiment. The electronic device 100 includes a first camera 102, a second camera 104, an enclosure 106, a display 110, an input/output (I/O) member 108, and an optional flash 112 or light source for the camera or cameras. The electronic device 100 can also include one or more internal components (not shown) typical of a computing or electronic device, such as, for example, one or more processors, memory components, network interfaces, and so on.

In the illustrated embodiment, the electronic device 100 is implemented as a smart telephone. Other embodiments, however, are not limited to this construction. Other types of computing or electronic devices can include one or more cameras, including, but not limited to, a netbook or laptop computer, a tablet computer, a digital camera, a printer, a scanner, a video recorder, and a copier.

As shown in FIGS. 1A-1B, the enclosure 106 can form an outer surface or partial outer surface and protective case for the internal components of the electronic device 100, and may at least partially surround the display 110. The enclosure 106 can be formed of one or more components operably connected together, such as a front piece and a back piece. Alternatively, the enclosure 106 can be formed of a single piece operably connected to the display 110.

The I/O member 108 can be implemented with any type of input or output member. By way of example only, the I/O member 108 can be a switch, a button, a capacitive sensor, or other input mechanism. The I/O member 108 allows a user to interact with the electronic device 100. For example, the I/O member 108 may be a button or switch to alter the volume, return to a home screen, and the like. The electronic device can include one or more input members or output members, and each member can have a single I/O function or multiple I/O functions.

The display 110 can be operably or communicatively connected to the electronic device 100. The display 110 can be implemented with any type of suitable display, such as a retina display or an active matrix color liquid crystal display. The display 110 can provide a visual output for the electronic device 100 or function to receive user inputs to the electronic device. For example, the display 110 can be a multi-touch capacitive sensing touchscreen that can detect one or more user inputs.

Figure 2:
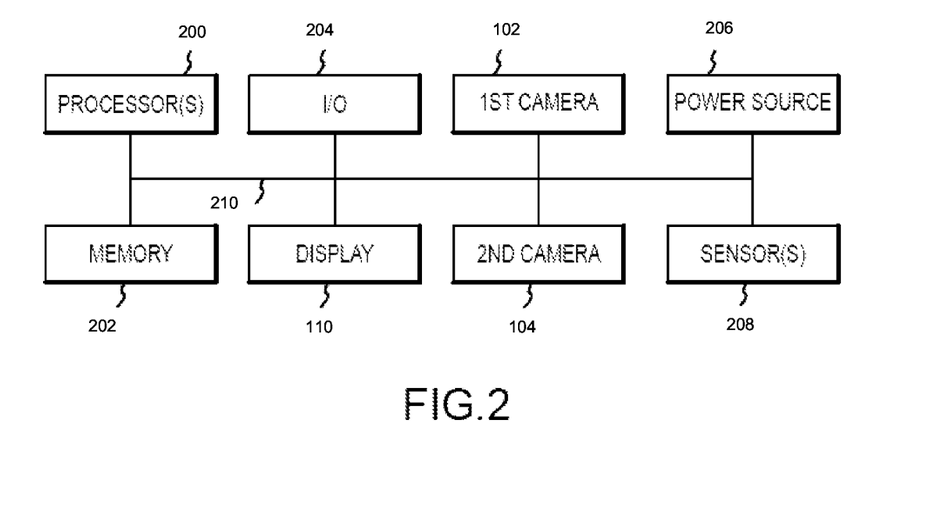
FIG. 2 illustrates a simplified block diagram of the electronic device of FIG. 1 in an embodiment.

The electronic device 100 can also include a number of internal components. FIG. 2 illustrates one example of a simplified block diagram of the electronic device 100. The electronic device can include one or more processors 200, storage or memory components 202, input/output interface 204, power sources 206, and sensors 208, each of which will be discussed in turn below.

The one or more processors 200 can control some or all of the operations of the electronic device 100. The processor(s) 200 can communicate, either directly or indirectly, with substantially all of the components of the electronic device 100. For example, one or more system buses 210 or other communication mechanisms can provide communication between the processor(s) 200, the cameras 102, 104, the display 110, the I/O member 108, or the sensors 208. The processor(s) 200 can be implemented as any electronic device capable of processing, receiving, or transmitting data or instructions. For example, the one or more processors 200 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The memory 202 can store electronic data that can be used by the electronic device 100. For example, the memory 202 can store electrical data or content such as, for example, audio files, document files, timing signals, and image data. The memory 202 can be configured as any type of memory. By way of example only, memory 202 can be implemented as random access memory, read-only memory, Flash memory, removable memory, or other types of storage elements, in any combination.

The input/output interface 204 can receive data from a user or one or more other electronic devices. Additionally, the input/output interface 204 can facilitate transmission of data to a user or to other electronic devices. For example, in embodiments where the electronic device 100 is a smart telephone, the input/output interface 204 can receive data from a network or send and transmit electronic signals via a wireless or wired connection. Examples of wireless and wired connections include, but are not limited to, cellular, WiFi, Bluetooth, and Ethernet. In one or more embodiments, the input/output interface 204 supports multiple network or communication mechanisms. For example, the input/output interface 204 can pair with another device over a Bluetooth network to transfer signals to the other device while simultaneously receiving signals from a WiFi or other wired or wireless connection.

The power source 206 can be implemented with any device capable of providing energy to the electronic device 100. For example, the power source 206 can be a battery or a connection cable that connects the electronic device 100 to another power source such as a wall outlet.

The sensors 208 can by implemented with any type of sensors. Examples of sensors include, but are not limited to, audio sensors (e.g., microphones), light sensors (e.g., ambient light sensors), gyroscopes, and accelerometers. The sensors 208 can be used to provide data to the processor 200, which may be used to enhance or vary functions of the electronic device.

Figure 3:
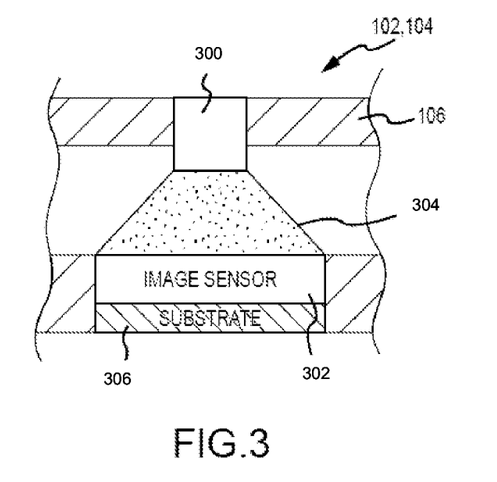
FIG. 3 depicts a cross-section view of the electronic device of FIG. 1A taken along line 3-3 in FIG. 1A.

As described with reference to FIGS. 1A and 1B, the electronic device 100 includes one or more cameras 102, 104 and optionally a flash 112 or light source for the camera or cameras. FIG. 3 is a simplified cross-section view of the camera 102 taken along line 3-3 in FIG. 1A. Although FIG. 3 illustrates the first camera 102, those skilled in the art will recognize that the second camera 104 can be substantially similar to the first camera 102. In some embodiments, one camera may include a global shutter configured image sensor and one camera can include a rolling shutter configured image sensor. In other examples, one camera can include an image sensor with a higher resolution than the image sensor in the other camera.

The cameras 102, 104 include an imaging stage 300 that is in optical communication with an image sensor 302. The imaging stage 300 is operably connected to the enclosure 106 and positioned in front of the image sensor 302. The imaging stage 300 can include conventional elements such as a lens, a filter, an iris, and a shutter. The imaging stage 300 directs, focuses or transmits light 304 within its field of view onto the image sensor 302. The image sensor 302 captures one or more images of a subject scene by converting the incident light into electrical signals.

The image sensor 302 is supported by a support structure 306. The support structure 306 can be a semiconductor-based material including, but not limited to, silicon, silicon-on-insulator (SOI) technology, silicon-on-sapphire (SOS) technology, doped and undoped semiconductors, epitaxial layers formed on a semiconductor substrate, well regions or buried layers formed in a semiconductor substrate, and other semiconductor structures.

Various elements of imaging stage 300 or image sensor 302 can be controlled by timing signals or other signals supplied from a processor or memory, such as processor 200 in FIG. 2. Some or all of the elements in the imaging stage 300 can be integrated into a single component. Additionally, some or all of the elements in the imaging stage 300 can be integrated with the image sensor 302, and possibly one or more additional elements of the electronic device 100, to form a camera module. For example, a processor or a memory may be integrated with the image sensor 302 in some embodiments.

Figure 4:
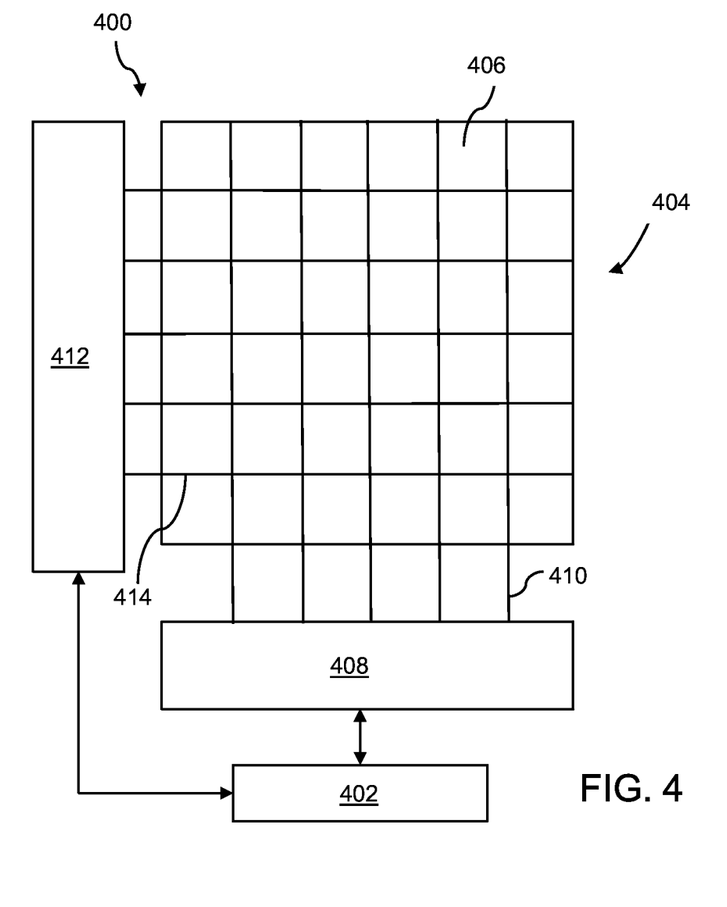
FIG. 4 illustrates a simplified block diagram of one example of an image sensor that is suitable for use as image sensor 302 in an embodiment.

Referring now to FIG. 4, there is shown a top view of one example of an image sensor suitable for use as image sensor 302 in an embodiment. The image sensor 400 can include an image processor 402 and an imaging area 404. The imaging area 404 can be implemented as a pixel array that includes pixels 406. In the illustrated embodiment, the pixel array is configured in a row and column arrangement. However, other embodiments are not limited to this configuration. The pixels in a pixel array can be arranged in any suitable configuration, such as, for example, a hexagon configuration.

The imaging area 404 may be in communication with a column select 408 through one or more column select lines 410 and a row select 412 through one or more row select lines 414. The row select 412 selectively activates a particular pixel 406 or group of pixels, such as all of the pixels 406 in a certain row. The column select 408 selectively receives the data output from the select pixels 406 or groups of pixels (e.g., all of the pixels with a particular column).

The row select 412 and/or the column select 408 may be in communication with the image processor 402. The image processor 402 can process data from the pixels 406 and provide that data to the processor 200 and/or other components of the electronic device 100. It should be noted that in some embodiments, the image processor 402 can be incorporated into the processor 200 or separate therefrom.

Figure 5:
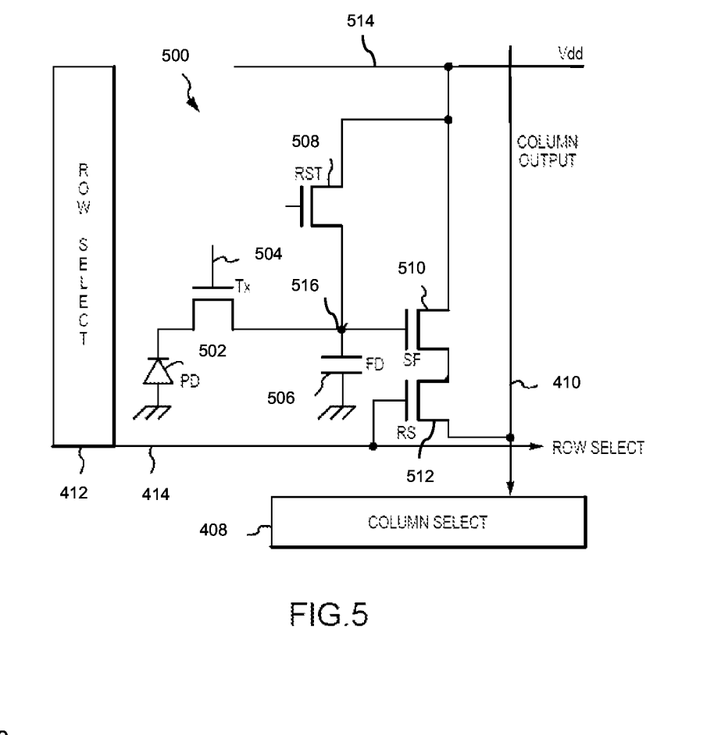
FIG. 5 depicts a simplified schematic view of a pixel suitable for use in an image sensor in an embodiment.

Referring now to FIG. 5, there is shown a simplified schematic view of a pixel that is suitable for use as pixels 406 in an embodiment. The pixel 500 includes a photodetector (PD) 502, a transfer transistor (TX) 504, a sense region 506, a reset (RST) transistor 508, a readout transistor 510, and a row select (RS) transistor 512. The sense region 506 is represented as a capacitor in the illustrated embodiment because the sense region 506 can temporarily store charge received from the photodetector 502. As described below, after charge is transferred from the photodetector 502, the charge can be stored in the sense region 506 until the gate of the row select transistor 512 is pulsed.

One terminal of the transfer transistor 504 is connected to the photodetector 502 while the other terminal is connected to the sense region 506. One terminal of the reset transistor 508 and one terminal of the readout transistor 510 are connected to a supply voltage (Vdd) 514. The other terminal of the reset transistor 508 is connected to the sense region 506, while the other terminal of the readout transistor 510 is connected to a terminal of the row select transistor 512. The other terminal of the row select transistor 512 is connected to an output line 410.

By way of example only, in one embodiment the photodetector 502 is implemented as a photodiode (PD) or pinned photodiode, the sense region 506 as a floating diffusion (FD), and the readout transistor 510 as a source follower transistor (SF). The photodetector 502 can be an electron-based photodiode or a hole based photodiode. It should be noted that the term photodetector as used herein is meant to encompass substantially any type of photon or light detecting component, such as a photodiode, pinned photodiode, photogate, or other photon sensitive region. Additionally, the term sense region as used herein is meant to encompass substantially any type of charge storing or charge converting region.

Those skilled in the art will recognize that the pixel 500 can be implemented with additional or different components in other embodiments. For example, a row select transistor can be omitted and a pulsed power supply mode used to select the pixel, the sense region can be shared by multiple photodetectors and transfer transistors, or the reset and readout transistors can be shared by multiple photodetectors, transfer gates, and sense regions.

When an image is to be captured, an integration period for the pixel begins and the photodetector 502 accumulates photo-generated charge in response to incident light. When the integration period ends, the accumulated charge in the photodetector 502 is transferred to the sense region 506 by selectively pulsing the gate of the transfer transistor 504.

Typically, the reset transistor 508 is used to reset the voltage on the sense region 506 (node 516) to a predetermined level prior to the transfer of charge from the photodetector 502 to the sense region 506. When charge is to be readout of the pixel, the gate of the row select transistor is pulsed through the row select 412 and row select line 414 to select the pixel (or row of pixels) for readout. The readout transistor 510 senses the voltage on the sense region 506 and the row select transistor 512 transmits the voltage to the output line 410. The output line 410 is connected to readout circuitry and (optionally an image processor) through the output line 410 and the column select 408.

In some embodiments, an image capture device, such as a camera, may not include a shutter over the lens, and so the image sensor may be constantly exposed to light. In these embodiments, the photodetectors may have to be reset or depleted before a desired image is to be captured. Once the charge from the photodetectors has been depleted, the transfer gate and the reset gate are turned off, isolating the photodetectors. The photodetectors can then begin integration and collecting photo-generated charge.

Figure 6:
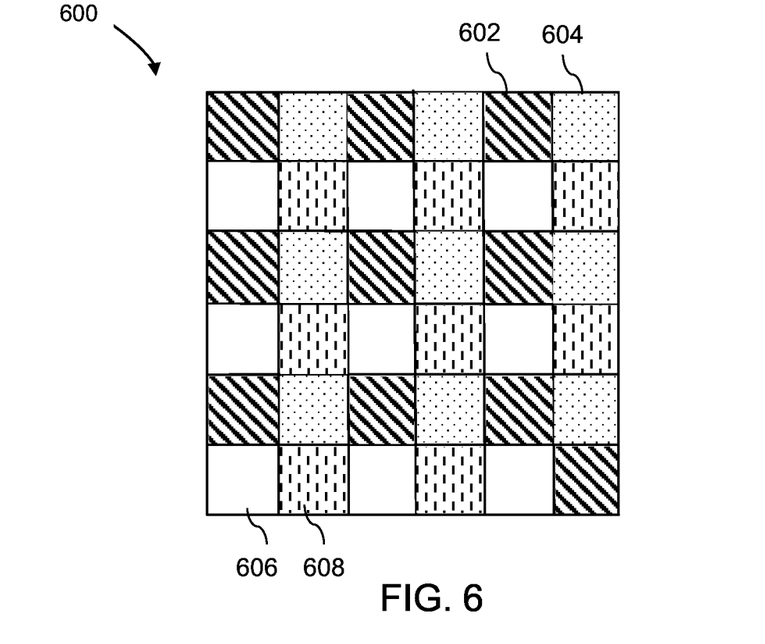
FIG. 6 illustrates one example of a color filter array suitable for use with an image sensor in an embodiment.

In general, photodetectors detect light with little or no wavelength specificity, making it difficult to identify or separate colors. When color separation is desired, a color filter array can be disposed over the imaging area to filter the wavelengths of light sensed by the photodetectors in the imaging area. A color filter array is a mosaic of filter elements with each filter element typically disposed over a respective pixel. A filter element restricts the wavelengths of light detected by a photodetector, which permits color information in a captured image to be separated and identified. FIG. 6 illustrates one example of a color filter array suitable for use with an image sensor in an embodiment. The color filter array (CFA) 600 includes filter elements 602, 604, 606, 608. Although only a limited number of filter elements are shown, those skilled in the art will recognize that a CFA can include thousands or millions of filter elements.

In one embodiment, each filter element restricts light wavelengths. In another embodiment, some of the filter elements filter light wavelengths while other filter elements are panchromatic. A panchromatic filter element can have a wider spectral sensitivity than the spectral sensitivities of the other filter elements in the CFA. For example, a panchromatic filter element can have a high sensitivity across the entire visible spectrum. A panchromatic filter element can be implemented, for example, as a neutral density filter or a color filter. Panchromatic filter elements can be suitable in low level lighting conditions, where the low level lighting conditions can be the result of low scene lighting, short exposure time, small aperture, or other situations where light is restricted from reaching the image sensor.

Figure 7:
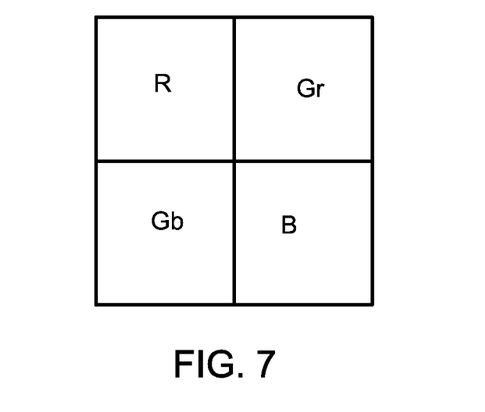
FIG. 7 depicts a Bayer color filter array pattern.

Color filter arrays can be configured in a number of different mosaics. The color filter array 600 can be implemented as a red (R), green (G), and blue (B) color filter array or a cyan (C), magenta (M), yellow (Y) color filter array. The Bayer pattern is a well know color filter array pattern. The Bayer color filter array filters light in the red (R), green (G), and blue (B) wavelengths ranges (see FIG. 7). The Bayer color filter pattern includes two green color filter elements (Gr and Gb), one red color filter element, and one blue color filter element. The group of four filter elements is tiled or repeated over the pixels in an imaging area to form the color filter array.

Figure 8:
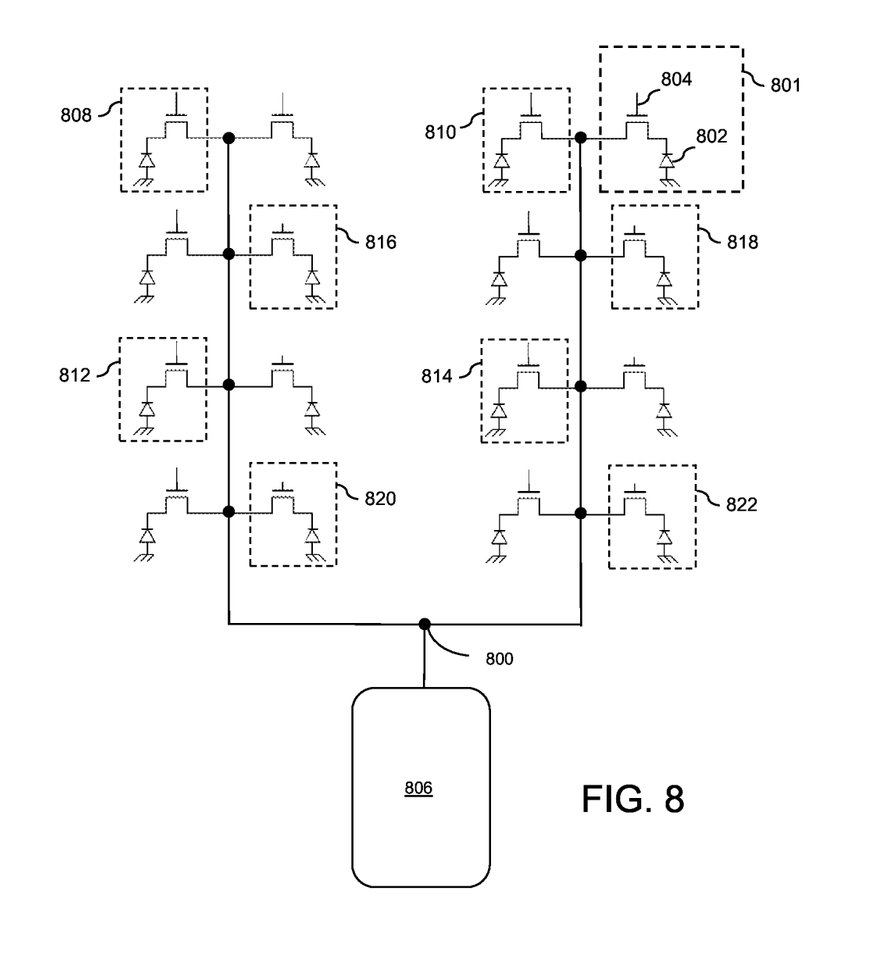
FIG. 8 illustrates one example of a shared pixel architecture in an embodiment.

Referring now to FIG. 8, there is shown one example of a shared pixel architecture in an embodiment. In the illustrated embodiment, sixteen pixels are connected to a shared common node 800. Each pixel 801 includes a photodetector 802 and a transfer transistor 804 connected between the photodetector 802 and the common node 800. Readout circuitry 806 can be connected to the common node 800. Since the readout circuitry 806 is connected to the common node 800, the sixteen pixels share the readout circuitry 806. By way of example only, the readout circuitry 806 can include a sense region, a reset transistor, and a readout transistor that can be configured as shown in FIG. 5. The sense region, the reset transistor and the readout transistor can be connected to the common node 800. A row select transistor can be connected to the readout transistor.

The gates of each transfer transistor 804 can be selectively pulsed in one embodiment, allowing charge from one or more photodetectors 802 to transfer to the common node 800. Since the transfer transistors 804 can each be selectively pulsed, the charge from one pixel or multiple pixels can be transferred separately, in combinations, or simultaneously to the common node 800. Thus, charge summing between the sixteen pixels can be flexible in that any combination of pixels can be summed. Charge summing can be performed with as few as two pixels up to all sixteen pixels. For example, the charge from pixels 808 and 814 can be summed together by separately or simultaneously pulsing the gates of the respective transfer transistors, thereby transferring the charge to the common node 800. The summed charge can then be readout using some or all of the components in the readout circuitry 806.

Figure 9:
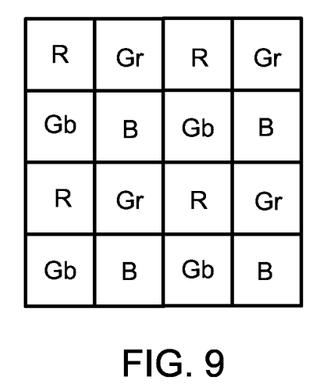
FIG. 9 depicts the Bayer color filter array pattern for the sixteen pixels shown in FIG. 8.

Charge summing can occur in the same color plane or in multiple color planes. FIG. 9 depicts the Bayer color filter pattern for the sixteen pixels shown in FIG. 8. Within the sixteen pixels, there are four different color planes. Four pixels are associated with the color red (R), four with the color green (Gr), four with the color green (Gb), and four with the color blue (B). In FIG. 8, pixels 808, 810, 812, 814 correspond to the red filter elements and pixels 816, 818, 820, 822 to the blue filter elements. In the illustrated embodiment, multiple different charge summing options can be implemented with flexible pixel summing in the same color plane. For example, in the red color plane, charge in pixels 808 and 810 can be summed together and read out, and charge in pixels 812 and 814 can be summed together and read out. Alternatively, charge in pixels 808 and 812 can be summed together and read out, and charge in pixels 810 and 814 can be summed together and read out. Likewise, charge in pixels 808 and 814 can be summed together and read out, and charge in pixels 810 and 812 can be summed together and read out. Alternatively, charge in three pixels (e.g., 808, 810, 812; 808, 810, 814; 808, 812, 814; or 810, 812, 814) can be summed together. And finally, charge in all four pixels 808, 810, 812, 814 can be summed together and read out.

In some embodiments, charge summing can occur across different color planes. For example, charge in one or more red pixels can be summed with charge in one or more green (Gr and/or Gb) pixels. Alternatively, charge in one or more blue pixels can be summed with charge in one or more green (Gr and/or Gb) pixels or with one or more red pixels. Likewise, charge from one or more red pixels, green pixels (Gr and/or Gb), and blue pixels can be summed together.

Thus, charge in any number of pixels that share a common node can be summed together. Thus, charge summing with two pixels can be performed as vertical two pixel summing, horizontal two pixel summing, diagonal two pixel summing, and four pixel summing. Alternatively, charge in three pixels up to sixteen pixels can be summed together. A processing device, such as, for example, processor 200 in FIG. 2 or image processor 402 in FIG. 4 can be used to select which pixels are summed together.

Flexible pixel summing can also be used with asymmetrical high dynamic range (HDR) imaging. For illustrative purposes only, asymmetrical HDR imaging will be described in conjunction with a four pixel shared architecture shown in FIG. 10. Four pixels 1000 are connected to a shared common node 1002. Readout circuitry 1004 is connected to the common node 1002, allowing the four pixels 1000 to share the readout circuitry. The readout circuitry can be configured with any suitable readout circuitry, such as with the readout circuitry described in conjunction with FIG. 8.

Figure 10:
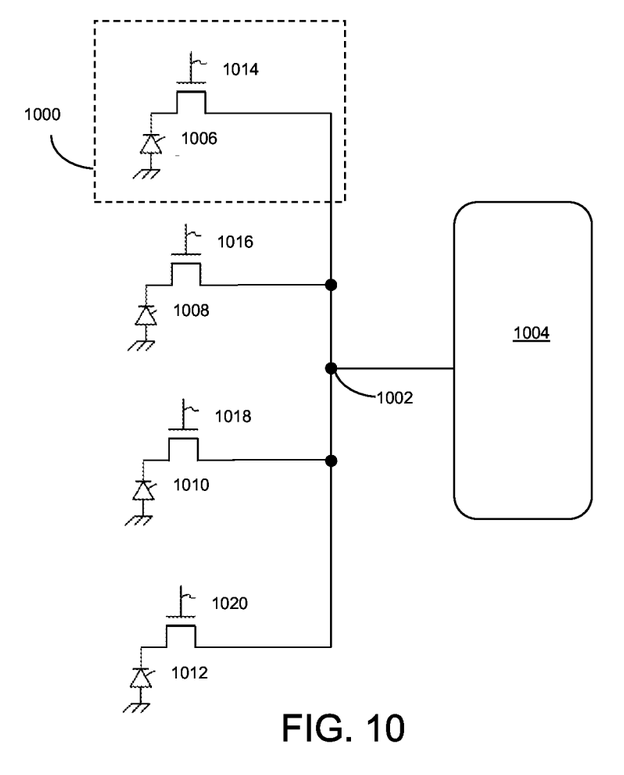
FIG. 10 illustrates another example of a shared pixel architecture in an embodiment.

Each pixel 1000 can include a photodetector 1006, 1008, 1010, 1012 and a transfer transistor 1014, 1016, 1018, 1020 connected between the photodetector and the shared common node 1002. The gates of each transfer transistor 1014, 1016, 1018, 1020 can be selectively pulsed in one embodiment, allowing charge from one or more photodetectors to transfer to the common node 1002. Since the transfer transistors 1014, 1016, 1018, 1020 can each be selectively pulsed, the charge from one, two, three, or four photodetectors can be transferred separately, in combinations, or simultaneously, and the charge in two or more photodetectors can be summed together.

Unlike conventional HDR imaging techniques that utilize different integration times for the pixels in an imaging array, with asymmetrical HDR imaging, all of the pixels can have the same integration time. A HDR image can be produced by reading out un-summed charge from one pixel separately and then summing charge together from two or more pixels and reading out the summed charge. The un-summed charge and the summed charge can then be combined to produce a final HDR image.

For example, in the embodiment shown in FIG. 10, the gate of a transfer transistor 1014 connected to the photodetector 1006 can be pulsed to transfer the accumulated charge in the photodetector 1006 to the common node 1002. The charge can then be read out using some or all of the components in the readout circuitry 1004. The charge read out of the one photodetector 1006 is un-summed charge in that the charge has not been summed together with charge from another photodetector. The un-summed charge from the one photodetector can represent a first image of the scene.

Thereafter, the charge in three pixels can be summed together by selectively transferring the accumulated charge in the three photodetectors 1008, 1010, 1012 to the common node 1002, and then reading out the charge using some or all of the components in the readout circuitry 1004. The accumulated charge in the three photodetectors can be transferred sequentially, simultaneously, or in various combinations since the transfer gates of the respective transfer transistors 1016, 1018, 1020 can be selectively pulsed. The summed charge from the three photodetectors 1008, 1010, 1012 can represent a second image of the scene. A final HDR image can be obtained by combining or stitching the first and second images together.

The summed charge from the three photodetectors 1008, 1010, 1012 can have up to three times the sensitivity as the un-summed charge from the one photodetector 1006. Because all four of the photodetectors 1006, 1008, 1010, 1012 had the same integration time when the first and second images were captured, the final HDR image can be free of motion artifacts.

Other embodiments are not limited to summing charge from three photodetectors. Charge in two or more photodetectors can be summed together. The summed charge can represent a first image. The first image can be combined with un-summed charge to produce a final HDR image.

With the embodiment shown in FIG. 8, asymmetrical HDR imaging can be performed by reading out the four color planes separately. For example, charge in three pixels associated with the color red can be summed together and read out, followed by reading out the charge in the one remaining pixel associated with the color red. The same procedure is performed for the pixels associated with the green (Gr), blue, and green (Gb) color planes. The summed charge and the un-summed charge can then be combined to produce a final HDR image. For example, summed charge and un-summed charge can be combined first by color plane (e.g., summed and un-summed red combined for red color plane HDR image) and then all color planes can be combined to produce the HDR image. Alternatively, all of the summed and un-summed charge can be combined at once to produce the HDR image.

In some embodiments, color HDR imaging sums charge by color plane to preserve the color information. Thus, one example sums charge representing the color red together, charge representing the color blue together, charge representing the color green (Gr) together, and charge representing the color green (Gb) together. Other embodiments can sum charge in two or more color planes together to produce a monochrome HDR image.

Embodiments can construct an image sensor on a single semiconductor-based wafer or on multiple semiconductor-based wafers. When a single wafer is used, the components in each pixel reside in or on the single wafer. When multiple wafers are used, the components in each pixel can be divided between two or more wafers. For example, in the embodiment illustrated in FIG. 5, the photodetectors and the transfer transistors can reside on one wafer and the sense regions, reset transistors, readout transistors and row select transistors on a different wafer. Alternatively, with the embodiments shown in FIGS. 8 and 10, the photodetectors and the transfer transistors can reside on a first wafer and a common sense region on a second wafer. The reset, readout, and row select transistors can also be formed in or on the second wafer and can be shared by two or more photodetectors on the first wafer. An interconnect layer is typically used to electrically connect the transfer transistors to the sense region or regions.

Figure 11:
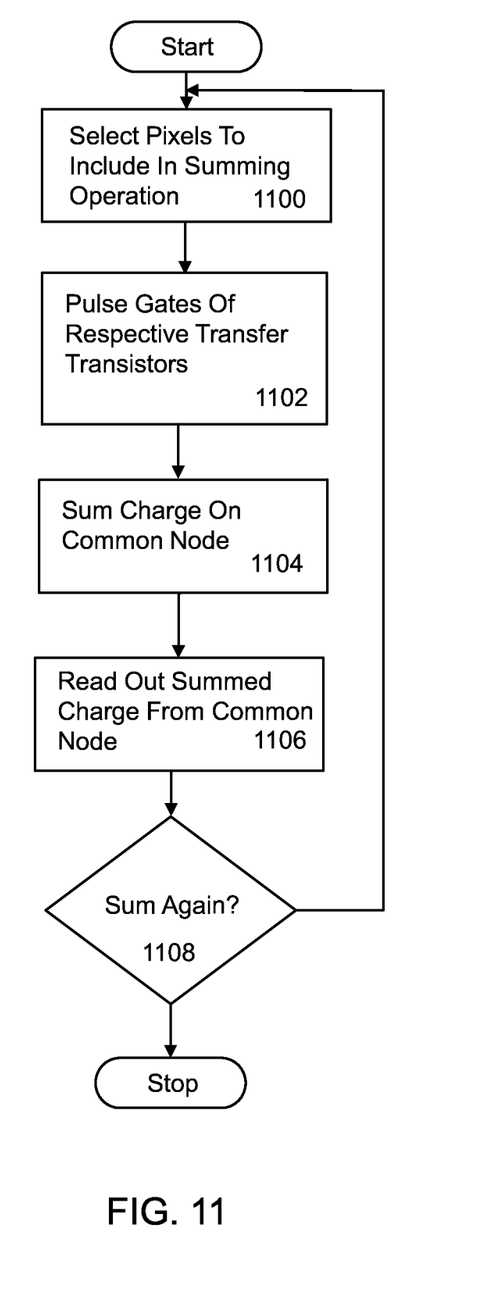
FIG. 11 is a flowchart of a method for flexible pixel summing in an embodiment.

Referring now to FIG. 11, there is shown a flowchart of a method for flexible pixel summing in an embodiment. Initially, the pixels to be included in a summing operation are selected (block 1100). In one embodiment, the pixels can be selected in real-time prior to, or after an image is captured. The selection can be based on, for example, the lighting conditions in a scene, the filter elements in a color filter array, the scene dynamic range, and a desired or given image resolution (summing charge reduces resolution).

Pixel selection allows the pixel summing to be flexible and dynamic in that the number of pixels connected to a common node that are included in a summing operation can vary for different summing operations. One or more logic circuits and/or a processor, such as the processor 200 in FIG. 2 or the image processor 402 in FIG. 4 can be used to select the pixels to be included in the summing operation.

The gates of the respective transfer transistors in the selected pixels are then pulsed at block 1102 to transfer the accumulated charge from the photodetectors connected to the respective transfer transistors to a common node (block 1104). The summed charge on the common node is then read out (block 1106). A determination is made at block 1108 as to whether another summing operation is to be performed. If so, the process returns to block 1100 and repeats until all of summing operations have been performed.

Other embodiments can perform the method shown in FIG. 11 differently. Additional blocks can be included or blocks can be omitted. For example, bock 1100 can be omitted in those embodiments where the pixels to be included are pre-determined (i.e., fixed) and known.

Figure 12:
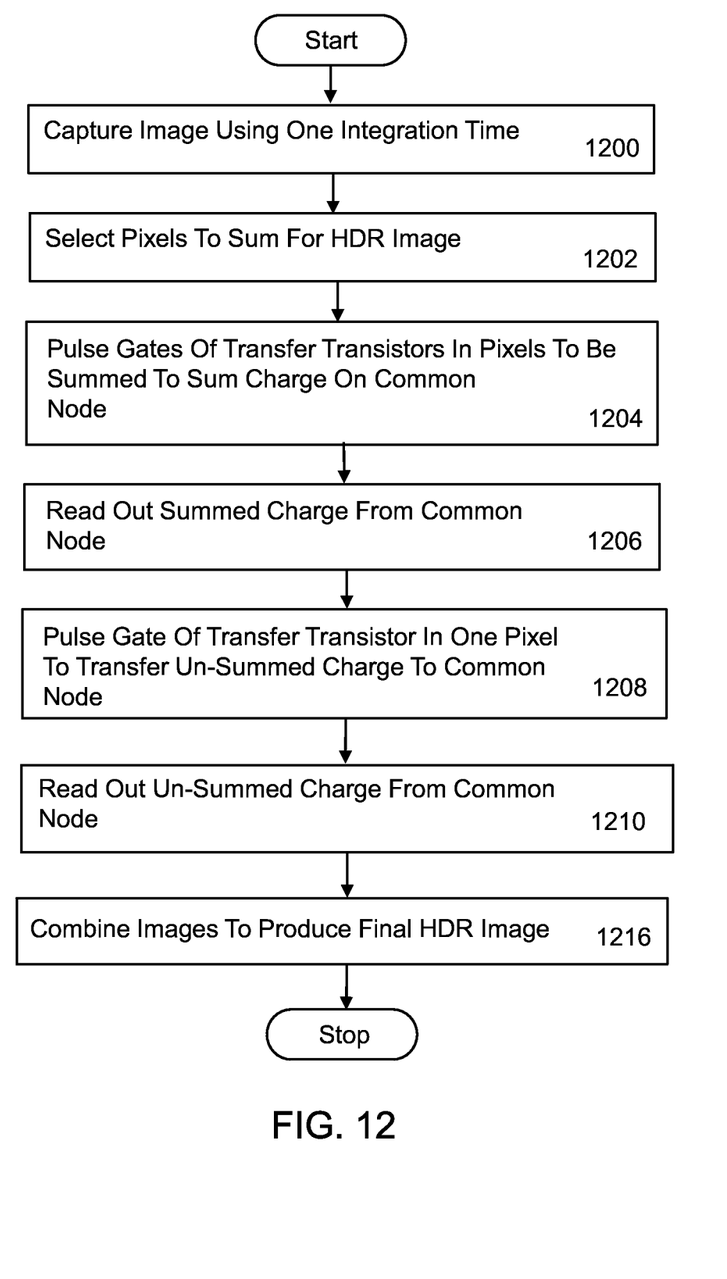
FIG. 12 is a flowchart of a method for asymmetrical high dynamic range imaging in an embodiment.

FIG. 12 is a flowchart of a method for asymmetrical high dynamic range imaging in an embodiment. Initially, an image of a subject scene is captured using a single integration time for all of the pixels in an imaging area (block 1200). Next, as shown in block 1202, the pixels to be included in a summing operation can be selected. Two or more pixels can be included in a summing operation. The two or more pixels are connected to a shared common node in one embodiment. Other embodiments are not limited to this construction and charge in selected pixels can be summed after the charge is read out of the imaging area or out of the image sensor.

The pixels to be included in a summing operation can be selected in real-time prior to capturing the image or after the image is captured. The determination can be based on, for example, the lighting conditions in a scene, the color filter elements in a color filter array, or a desired or given image resolution. Pixel selection allows the pixel summing to be flexible and dynamic in that the number of pixels connected to a common node that are included in a summing operation can vary for different summing operations. One or more logic circuits and/or a processor, such as the processor 200 in FIG. 2 or the image processor 402 in FIG. 4 can be used to select the pixels to be included in the summing operation.

In some embodiments, all of the pixels can be read out and the charge used to produce a HDR image. Other embodiments can read out and discard charge from some of the pixels and use the charge from the remaining pixels to produce the HDR image. By way of example only, with four red pixels, the charge in two pixels can be summed together (summed charge), the charge from one pixel read out (un-summed charge), and the charge in one pixel read out and discarded. The summed charge and the un-summed charge can then be combined for a HDR image. Thus, charge in only three of the four pixels is used to produce the HDR image.

The charge in the selected pixels is then summed together. For example, the gates of the transfer transistors connected to the photodetectors in the pixels to be included in the summing operation can be pulsed to transfer the accumulated charge from the photodetectors to a common node (block 1204). The charge can be transferred to the common node simultaneously, sequentially, or in various combinations. Transferring the charge to the common node sums the charge together. In one embodiment, the charge transferred and summed on the common node is charge that represents, or is associated with, one color plane. The summed charge represents a first image of the subject scene.

The summed charge is read out, and then the charge in one pixel is read out. For example, the charge can be read from the common node (block 1206) and the gate of a transfer transistor connected to one photodetector can be pulsed to transfer the accumulated charge from the photodetector to the common node (block 1208). The un-summed charge is then read out from the common node at block 1210. The un-summed charge represents a second image of the subject scene. A HDR image of the subject scene can then be created by combining the first and second images of the subject scene (block 1212).

The method shown in FIG. 12 is performed for each color plane in one embodiment. For example, with the Bayer color filter pattern, the process is performed for the red (R) color plane, the green Gr color plane, the green Gb color plane, and for the blue (B) color plane.

Other embodiments can perform the method shown in FIG. 12 differently. For example, bocks 1208 and 1210 can be performed before blocks 1202, 1204, and 1206. As another example, one or more blocks can be omitted, such as, for example, block 1202.

The embodiments described herein can provide an image sensor or image capture device that is capable of performing flexible pixel summing and asymmetrical HDR imaging. With flexible pixel summing, charge in any number of pixels can be summed together. In some embodiments, charge summing with two pixels can be performed as vertical two pixel summing, horizontal two pixel summing, diagonal two pixel summing, and four pixel summing. Alternatively, three or more pixels can be summed together. Charge representing the same color or different colors can be summed together.

With asymmetrical HDR imaging, all of the pixels in an imaging area can have the same integration time. Charge from multiple pixels can be summed together and read out to represent a first image of a subject scene. Un-summed charge from one pixel can be read out separately to represent a second image of the subject scene. The first and second images can then be combined to produce a final HDR image of the subject scene.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

The invention claimed is:

1. A method for performing flexible pixel summing in an image sensor that includes a plurality of pixels grouped into subsets of pixels with each subset of pixels including three or more pixels operably connected to a separate common node, the method comprising:
   in a subset of pixels, selecting, in real time and based on one or more criterion, N pixels to include in a summing operation, where N represents a number that is between two and a total number of pixels in the subset of pixels;
   summing charge in the N pixels together by transferring the charge from the N pixels to the common node; and
   reading out the summed charge from the common node.

2. The method as in claim 1, wherein the summed charge on the common node represents one color.

3. The method as in claim 1, wherein the summed charge on the common node represents two or more colors.

4. A method for asymmetrical high dynamic range imaging using an image sensor that includes a plurality of pixels, wherein the pixels are grouped into subsets of pixels and each subset includes three or more pixels, the method comprising:
   capturing an image of a subject scene using a single integration time for the plurality of pixels; and
   in a subset of pixels, reading out charge from N pixels selected from the subset and summing the charge together, wherein selection is based, at least in part, on one or more criterion and wherein N represents a number that is between two and one less than a total number of pixels in the subset of pixels;
   reading out un-summed charge from one pixel in the subset of pixels; and
   combining the un-summed charge with the summed charge when producing a high dynamic range image.

5. The method as in claim 4, wherein the summed charge is associated with one color.

6. The method as in claim 4, wherein the summed charge is associated with two or more colors.

7. The method as in claim 4, further comprising selecting which N pixels in the subset of pixels to sum prior to summing the charge in the N pixels together.

8. The method as in claim 7, wherein the selected N pixels are associated with one color.

9. A method for asymmetrical high dynamic range imaging using an image sensor that includes a plurality of pixels grouped into subsets of pixels and each subset includes three or more pixels operably connected to a separate common node, the method comprising:
   capturing an image of a subject scene using a single integration time for the plurality of pixels; and
   in a subset of pixels, summing charge in N pixels together by transferring the charge from the N pixels to the common node, wherein the N pixels are selected in real time based, at least in part, on one or more criterion and wherein N represents a number that is between two and one less than a total number of pixels in the subset of pixels;
   reading out the summed charge from the common node;
   reading out un-summed charge from one pixel in the subset of pixels; and
   combining the un-summed charge with the summed charge when producing a high dynamic range image.

10. The method as in claim 9, wherein the summed charge on the common node is associated with one color.

11. The method as in claim 9, wherein the summed charge on the common node is associated with two or more colors.

12. The method as in claim 9, further comprising selecting which N pixels in the subset of pixels to sum prior to summing the charge in the N pixels together.

13. An image sensor, comprising:
   an imaging area that includes a plurality of pixels, wherein the pixels are grouped into subsets of pixels with each subset including three or more pixels operably connected to a separate common node; and
   a processor for selecting N pixels to include in a summing operation, the pixels being selected in real time and based, at least in part, on one or more criterion.

14. The image sensor as in claim 13, further comprising readout circuitry operably connected to each common node.

15. The image sensor as in claim 13, wherein each readout circuitry operably connected to each common node includes a sense region operably connected to the common node and a readout transistor having a gate connected to the sense region.

16. The image sensor as in claim 13, wherein where N represents a number that is between two and a total number of pixels in a subset of pixels.

17. The image sensor as in claim 13, wherein where N represents a number that is between two and one less than a total number of pixels in a subset of pixels.

18. The image sensor as in claim 13, wherein each pixel includes a photodetector and a transfer transistor, wherein the transfer transistor is connected between the photodetector and a respective common node.

19. The image sensor as in claim 18, wherein a sense region is connected to each common node.

20. The image sensor as in claim 13, wherein the one or more criterion comprises one or more of: lighting conditions; filter elements in a color filter array; and image resolution.

* * * * *